J. ANDZIK.
LAMP ADJUSTING MECHANISM.
APPLICATION FILED SEPT. 22, 1911.
1,016,726.
Patented Feb. 6, 1912.
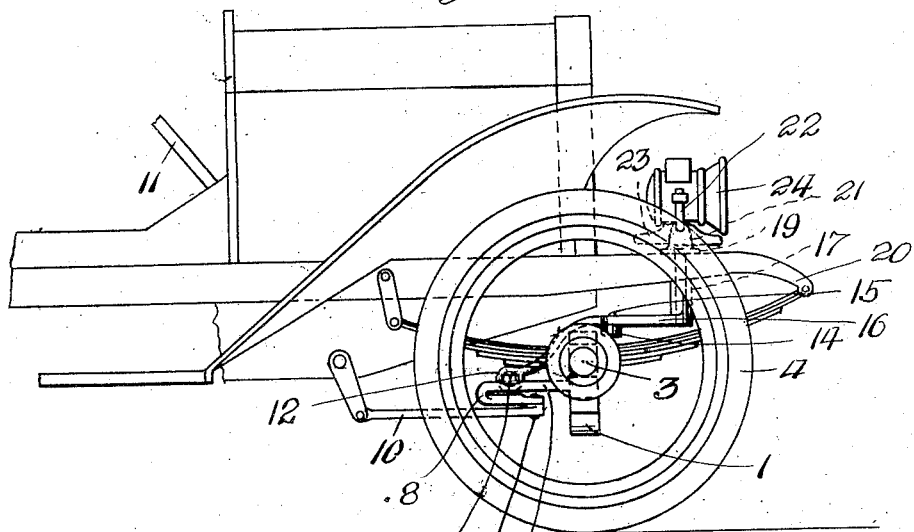
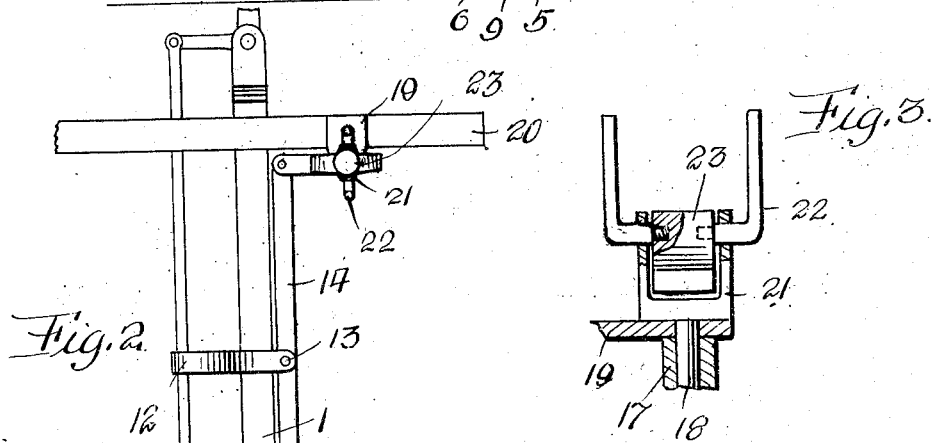
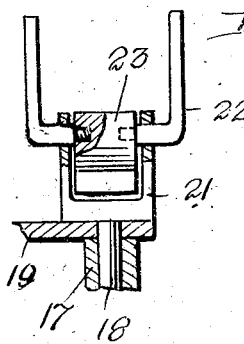
WITNESSES
Samuel Payne
Ralph C. Evert
INVENTOR
J. Andzik.
BY
ATTORNEYS

UNITED STATES PATENT OFFICE.

JOSEPH ANDZIK, OF DAYTON, OHIO.

LAMP-ADJUSTING MECHANISM.

1,016,726.  Specification of Letters Patent.  Patented Feb. 6, 1912.

Application filed September 22, 1911. Serial No. 650,670.

*To all whom it may concern:*

Be it known that I, JOSEPH ANDZIK, a subject of the King of Hungary, residing at Dayton, in the county of Montgomery and State of Ohio, have invented certain new and useful Improvements in Lamp-Adjusting Mechanism, of which the following is a specification, reference being had therein to the accompanying drawing.

This invention relates to a lamp adjusting mechanism for automobiles and other vehicles, and the primary object of my invention is to furnish an automobile with an adjusting mechanism that will normally retain lamps or lanterns of the automobile in position to cast rays of light in the direction in which the forward wheels of the automobile are moving.

Another object of this invention is to provide lamp holders with means for normally maintaining the lamps horizontal, whereby any inclination of the automobile body will not interfere with the projection of light in the path of the automobile.

A further object of this invention is to accomplish the above results by a combination of elements that will be hereinafter specifically described and then claimed.

Reference will now be had to the drawing, wherein:—

Figure 1 is a side elevation of a portion of an automobile provided with the lamp adjusting mechanism; Fig. 2 shows a plan of the adjusting mechanism, and Fig. 3 is an enlarged detailed sectional view of one of the lamp holders.

The reference numeral 1 denotes a forward axle of an automobile, said axle having knuckles 2 provided with spindles 3 for wheels 4. The knuckles 2 have rearwardly extending cranks 5 and the ends of these cranks are pivotally connected by pins 6 to the ends of a connecting rod 7. One of the cranks, preferably at the right hand side of the automobile, has curved extension 8 pivotally connected by a pin 9 to a steering rod 10 adapted to be actuated by a steering post 11.

Pivotally connected to the rod 7, intermediate the ends thereof, is the rear end of a curved arm 12 that extends upwardly over the axle 4 and has the forward end thereof fixed, as at 13 to a reach bar 14. This bar has the ends thereof pivotally connected, as at 15 to rearwardly extending cranks 16 having coupling member 17 rigidly connected to the lower ends of lamp holder stems 18. The stems 18 are revolubly supported in brackets 19, carried by the longitudinal frames 20 of the automobile. The upper ends of the stems have holders 21 and movably arranged in these holders are angle arms 22. The arms 22 are oppositely disposed and are connected by an oblong weight or body 23 adapted to normally maintain the arms 22 vertical. The arms 22 support a lamp or lantern 24.

In operation, a movement of the knuckles 2 imparts a movement to the lamp holders 23, through the medium of the connecting rod 7, arm 12, and bar 14. The lamps or lanterns 24 will be turned in a direction in parallelism to that of the forward wheels 4, consequently, when the automobile passes around the corner, the rays of light will be cast in the path of the forward wheels thus illuminating the path and preventing the operator of the automobile from running down or contacting with pedestrians or obstacles.

What I claim is:—

1. A combination with a steering mechanism of a motor vehicle, of a vertically disposed shiftable shaft actuated by said mechanism, a holder fixed to and movable with said shaft, oppositely disposed angle-shaped arms movably mounted in the upper portion of said holder and adapted to support a lamp, and a weight arranged within the holder and connected to said arms for normally maintaining the arms vertically.

2. A combination with a steering mechanism of a motor vehicle, of brackets carried by the frame of the vehicle, shiftable shafts mounted in said brackets and actuated by said mechanism, a holder mounted upon each of the brackets and connected to a shaft and shiftable with the latter, a pair of oppositely disposed angle-shaped arms movably mounted in the upper end of each of said holders and extending thereinto and capable of supporting a lamp, and a weight suspended in each of the holders by a pair of said arms for normally maintaining these latter vertically.

In testimony whereof I affix my signature in the presence of two witnesses.

JOSEPH ANDZIK.

Witnesses:
 H. V. BROENSTRUP,
 LOUIS MAKO.